United States Patent Office 3,826,849
Patented July 30, 1974

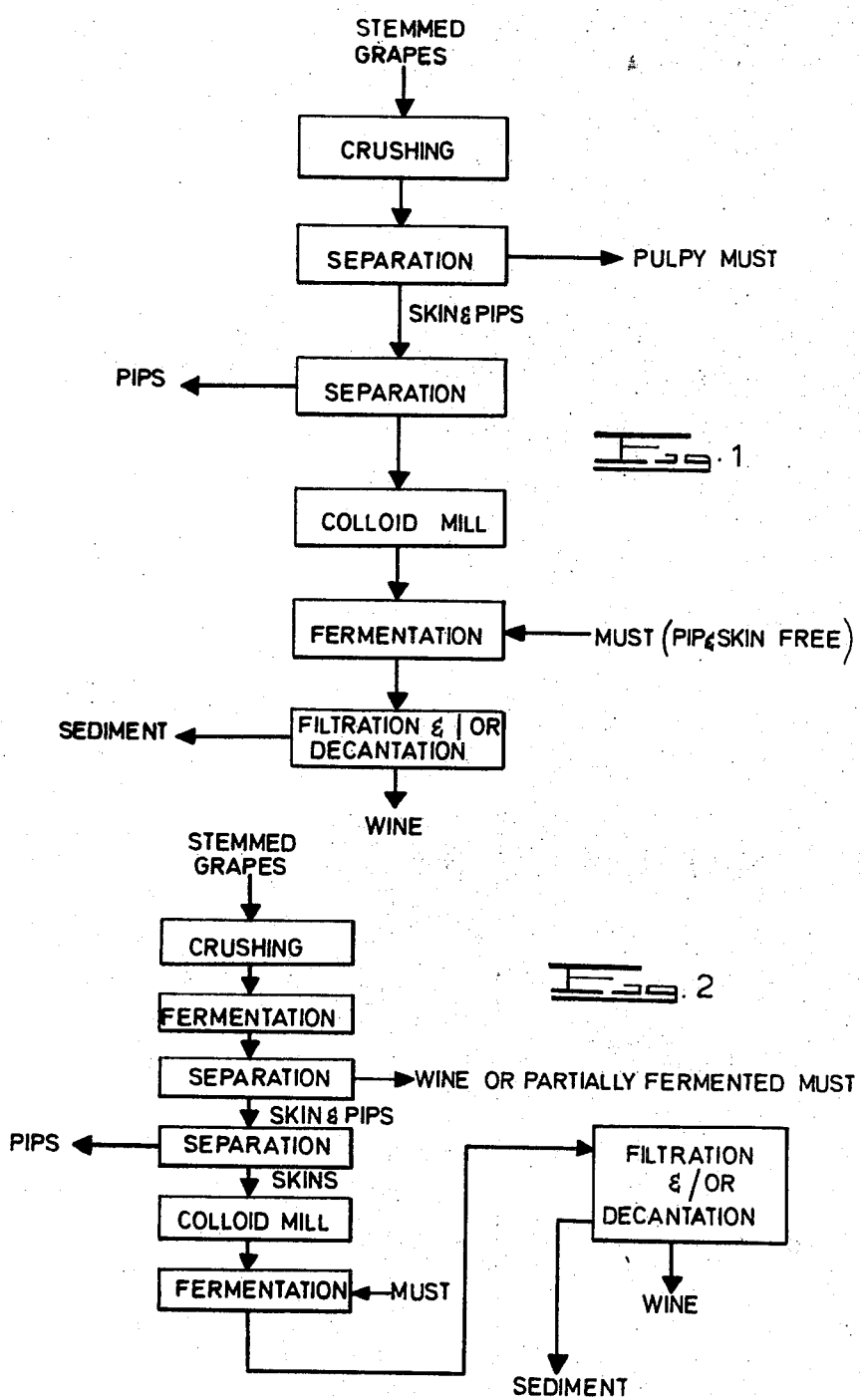

3,826,849
PREPARATION OF WINE
Peter Jacobus Venter and Johannes Daniel Malan, Stellenbosch, Cape Province, Republic of South Africa, assignors to Tobacco Research and Development Institute Limited, Zug, Switzerland
Continuation-in-part of abandoned application Ser No. 251,200, May 8, 1972. This application May 15, 1973, Ser. No. 360,609
Int. Cl. C12g 1/02
U.S. Cl. 426—15       3 Claims

ABSTRACT OF THE DISCLOSURE

In a wine making process the skins and pips are separated from the pulp after crushing of the grapes. The pips are removed and the skins are then finely ground in a colloid mill. The ground product is then added to a fermentation must for wine making. The must could be the original pulp or another must.

---

This application is a continuation-in-part of our patent application Ser. No. 251,200, filed May 8, 1972, now abandoned.

This invention relates to a process of wine making. In this specification the term "wine" is intended to mean the product made from grapes.

Conventionally the first step in wine making is stemming. Here the berries are removed from the stem. The next step is crushing the berries to break each berry and to expel the pulp from the skin. Depending on the type of wine to be made, the skins and the pips are separated from the pulp or must. For white wines it is conventional to conduct wine fermentation on the must without any skins or pips present. For rosé wine the skin and pips are present for a portion of the fermentation period. Finally red wine is fermented from a must containing skins and pips. The skins form a cap on the fermentation mass and the cap has to be immersed into the fermentation mass by some process such as periodically pushing the cap down.

Modern industrial techniques are being applied to wine making on an increasing scale. These techniques such as pumping and the use of closed vessels are more readily applied to the making of white wine as must containing skins cannot readily be pumped and be processed in closed vessels.

With a view to facilitating the handling of the must it has been proposed in U.S. Pat. 2,852,387 simultaneously to disintegrate the pulp, skin, pips, and stems in a single operation. Fermentation is then conducted on this disintegrated mass. However, Ametine et al. in The Technology of Wine Making at page 250 characterise the wine as having a stemmy taste. They go on to say that for distilling material the disintegrator is undoubtedly of great utility.

The applicants have found that with total disintegration there is also a putrid or rancid taste which is due to the oil contained in the pips.

At best wine made from totally disintegrated grape bunches is of an inferior quality and the method of total disintegration cannot be used for quality wines.

An object of the invention is to provide a wine of a better quality compared to wines made from the same raw materials while at the same time, at least in some embodiments, the must is easier to handle.

According to the invention a wine making process, in which grape berries are stemmed, crushed after stemming to liberate the pulp and the pulp is fermented in the presence of grape skins, is characterised in that grape skins and pips are separated from the pulp, the skins and pips are separated from one another, the pip-free skins are finely comminuted, the comminuted skins are added to a pulp to form a suspension, and the suspension is fermented to make wine.

Preferably the skins are comminuted in a colloid mill. In the result the skin particles have a maximum diameter of 1 millimetre or less and preferably of between 0.1 and 1 millimetre.

The invention is further discussed with reference to the accompanying drawings, in which:

FIG. 1 is a flow sheet of one process according to the invention, and

FIG. 2 is a flow sheet of an alternative process.

In FIG. 1 stemmed grape berries are first crushed in a conventional way to free the pulp from the skins. Next the skins and pips are separated from the pulp, as for white wine making. The pulp that remains is used for making wine on its own or it may be the must that is introduced later on in the process illustrated in FIG. 1.

The pips are next removed from the skins. Up to now the inventors have not encountered a satisfactory way of mechanically separating skins from pips in the freshly crushed state. Of necessity in the process of FIG. 1 the separation must be by hand. The inventors have successfully used hand separation through holed screens. This process being labour intensive is only suitable for highly priced wines.

The pip-free skins are then passed through a colloid mill which comminutes them very finely.

The ground product is then mixed with a suitable must, which may be the original pulp from which the skins came or another pulp. The mixture is subjected to controlled fermentation. The mixed product can be handled like any white wine pulp and fermentation can be conducted in closed fermentation vessels. While a cap in the accepted sense of the word is not formed, some of the skin particles tend to float to the top and these should be recirculated.

Since there is no pumping problem, pumps could be used to draw material from the top and reintroduce it to the base of a vessel or the other way round.

The fermentation product is treated in the usual way to provide wine and a sediment as a waste product.

Sometimes the sediment could be used with another quantity of must to prepare some more wine.

A number of experiments utilising the process of FIG. 1 have been carried out. These experiments were not quantitative. However, in each case it was found that the quality of the wine produced was better than that of wine produced in a conventional manner from the same raw material. Except for the difficulty of separating skins and pips the material handled much easier than in conventional red wine making processes. Of course, not only red wine was made.

To obviate the difficulties with pip and skin separation the process of FIG. 2 was devised. In this process the grapes are crushed and the must fermented in the usual way. After fermentation the skins and pips are separated from the wine. Now the skins and pips can be separated by utilising conventional machinery such as the Garolla depipper.

The fermentation need not be complete before the Garolla depipper can work. A partial fermentation is sufficient.

In the process of FIG. 2 a conventional first class wine may first be made. Then the skins are used after passing through the colloid mill to produce a lesser grade wine, but even then the latter has been found by organoleptic tests to be better than that conventionally produced from the same must.

It is also possible to conduct the fermentation partially and then to separate the skins and pips from the must.

After passing through a depipper and colloid mill the skins are returned to their source and fermentation continued to the end on the mixture of must and ground skins. The following experiment describes such a process.

EXPERIMENT

During the 1973 wine season in South Africa relatively low quality grapes of the Hermitage variety were produced by the vineyards. The harvest had a weak colour, light red instead of black, and was low in sugar content: 19.5° B. to 21.5° B. as compared to 22° B. to 26° B. during other seasons.

A portion of the Hermitage grapes going into a winery from a crusher was diverted and subjected to a special treatment as follows. The must, including skins and pips, was fermented until the sugar content reached about 12° B. in a conventional red wine making vat. The sap was then withdrawn and the remaining mass of skins and pips passed through a Garolla depipper. The skins mixed with some sap were ground in a colloid mill and returned to the main body of sap. Fermentation was allowed to continue until the sugar content was 0° B. The latter step took place in a closed vessel and the sap was withdrawn at the base and pumped into the top on top of the rising skin particles.

The finished wine and solid residues were then separated in the usual way.

In the experiment 131,190 kg. of crushed grapes were used and this produced 129,335 litres of wine. The production of wine per kg. of grapes were exceptionally high.

The fresh wine was submitted to three wine experts. They pronounced the colour very good in the light of the bad raw material. Furthermore they pronounced the flavour and aroma better than that obtained in normal years from the Hermitage variety of grapes. They rated the quality 15 to 20% higher than usual. One expert predicted that the wine produced by the experiment would be ready for the market within six months. Normally Hermitage wines have to age at least 18 months before they are released to the market.

The large scale experiment conducted according to the FIG. 2 embodiment has thus confirmed the small scale experiments conducted with the FIG. 1 embodiment. The applicant believes that the quality of wine produced from almost any grape variety can be improved by the processes of the invention. The stemmy taste of total disintegration is avoided and the rancid taste that sometimes results from fermentation in the presence of pips is also avoided.

What is claimed is:

1. A wine making process in which grape berries are stemmed, crushed after stemming to liberate the pulp, the crushed pulp, skins and pips are first partially fermented, the skins and pips are separated from the pulp, the skins and pips are separated from one another, the skins are finely comminuted, the finely commuted skins are added back to the partially fermented pulp, and the suspension of partially fermented pulp and comminuted skins is fermented to make wine.

2. A wine making process in which grape berries are stemmed, crushed after stemming to liberate the pulp, the skins and pips are separated from the pulp, the skins and pips are separated from one another, the skins are finely comminuted, the finely comminuted skins are added to a skin and pip free pulp to form a suspension and the suspension is fermented to make wine.

3. The process claimed in claim 2 in which the finely comminuted skins are added back to the pulp from which they were originally derived.

References Cited

UNITED STATES PATENTS 2,852,387   9/1958   Minetti _____ 99—35

OTHER REFERENCES

Ametine et al.: The Technology of Wine Making, 2nd ed., The Avi Publ. Co., Inc. Westport, Conn., 1967 (pp. 247–250 and 361–374).

DAVID M. NAFF, Primary Examiner

U.S. Cl. X.R.

426—484